United States Patent [19]

Hardenbrook et al.

[11] Patent Number: 4,761,256

[45] Date of Patent: Aug. 2, 1988

[54] METHOD FOR PRODUCING MICROCELLULAR FOAMED PLASTIC MATERIAL WITH SMOOTH INTEGRAL SKIN

[75] Inventors: Scott B. Hardenbrook, Kent; Louis P. Harasta, Jr., Rochester; Stephen T. Faulkenberry, Conesus; Richard D. Bomba, Rochester, all of N.Y.

[73] Assignee: Eastman Kodak Company, Rochester, N.Y.

[21] Appl. No.: 6,830

[22] Filed: Jan. 27, 1987

[51] Int. Cl.$^4$ .............................................. B29C 67/22
[52] U.S. Cl. ................... 264/45.5; 264/40.7; 264/50; 425/4 C; 425/135
[58] Field of Search ............... 425/4 C, 135, 817 C, 425/143; 264/28, 40.7, 45.5, 45.6, 45.9, 48, 50, 51, 52, 53, 55, 338, DIG. 14

[56] References Cited

U.S. PATENT DOCUMENTS

| | | | |
|---|---|---|---|
| 2,317,448 | 4/1943 | Dreyfus et al. | 68/5 E |
| 2,447,055 | 8/1948 | Cooper | 264/50 |
| 2,531,665 | 11/1950 | Booth | 264/50 |
| 2,751,627 | 6/1956 | Lindemann | 264/50 |
| 2,768,407 | 10/1956 | Lindemann | 264/50 |
| 3,154,605 | 10/1964 | Meyer et al. | 264/53 |
| 3,158,886 | 12/1964 | Grimes | 15/100 |
| 3,224,497 | 12/1965 | Blomgren, Sr. et al. | 425/174.8 E |
| 3,350,734 | 11/1967 | Holm | 15/102 |
| 3,364,519 | 1/1968 | Pitsch | 425/4 C |
| 3,389,199 | 6/1968 | Bushnell, Jr. et al. | 264/53 |
| 3,608,056 | 9/1971 | Nelson | 425/4 C |
| 3,610,000 | 10/1971 | Lopata | 68/5 |
| 3,676,537 | 7/1972 | Winstead | 425/4 C |
| 3,711,584 | 1/1973 | Sagane et al. | 425/4 C |
| 3,762,870 | 10/1973 | Probst et al. | 8/151 |
| 3,883,625 | 5/1975 | Thomas et al. | 264/45.6 |
| 3,922,328 | 11/1975 | Johnson | 264/DIG. 14 |
| 3,988,404 | 10/1976 | Orimo | 264/45.9 |
| 4,055,612 | 10/1977 | Zimmer | 264/40.7 |
| 4,065,137 | 12/1977 | Rueggeberg et al. | 277/34 |
| 4,107,354 | 8/1978 | Wilkenloh et al. | 427/118 |
| 4,244,078 | 1/1981 | Hughes et al. | 15/302 |
| 4,250,130 | 2/1981 | LaSpisa et al. | 264/40.7 |
| 4,268,977 | 5/1981 | Geiger | 34/242 |
| 4,304,713 | 12/1981 | Perelman | 264/45.9 |
| 4,473,665 | 9/1984 | Martini-Vvedensky et al. | 521/79 |

FOREIGN PATENT DOCUMENTS

| | | | |
|---|---|---|---|
| 48-4473 | 2/1973 | Japan | 264/DIG. 14 |
| 59-169824 | 9/1984 | Japan | |
| 59-169825 | 9/1984 | Japan | |
| 60-99629 | 6/1985 | Japan | |

Primary Examiner—Jan H. Silbaugh
Assistant Examiner—Jill L. Fortenberry
Attorney, Agent, or Firm—Armin B. Pagel

[57] ABSTRACT

The present invention is directed to the continuous production of microcellular plastic web material having integral unmodified laminar skin. In accordance with the invention a web of plastic material impregnated with an inert gas is delivered continuously to a degassing device in which the degree to which gas diffuses out of the surfaces of the web can be selectively and continuously controlled, whereupon the web enters a foaming station where it is reheated to induce foaming. The temperature of the reheated web and the duration of the foaming process prior to quenching are also selectively controllable to produce the desired web characteristics. The gas-impregnated plastic web can be produced initially by any of several novel means including a continuous device for impregnating a previously formed web and several versions of die devices which operate either by rapidly quenching the extruded gas-impregnated plastic material before any significant foaming has occurred or by maintaining the material above its foaming pressure within the die until the material has cooled to below the temperature at which foaming occurs.

6 Claims, 5 Drawing Sheets

METHOD FOR PRODUCING MICROCELLULAR FOAMED PLASTIC MATERIAL WITH SMOOTH INTEGRAL SKIN

BACKGROUND OF THE INVENTION

1. Field of the Invention

The present invention relates generally to the production of foamed plastic material and more particularly to the production of sheets, webs or strands with integral unmodified smooth skin from microcellular foamed plastic material, by which is meant a plastic material having uniformly distributed voids or cells of very small size, i.e. on the order of 2 to 25 microns.

2. Description of the Prior Art

As disclosed in U.S. Pat. No. 4,473,665, issued on Sept. 25, 1984, and assigned to the Massachusetts Institute of Technology, foamed plastic material with very small and uniformly distributed voids or cells can be produced by impregnating a plastic material under pressure with an inert gas, which nucleates and expands to provide the desired cellular structure when the material is at a temperature within the range of its glass transition temperature and the pressure is reduced. The resulting product is referred to as microcellular foam, which characterizes a product having uniformly distributed voids or closed cells of very small size, e.g. 2 to 25 microns. In one embodiment, a batch process is disclosed in which a previously formed plastic sheet or other article is impregnated with gas under pressure, the pressure is reduced to ambient, the material is heated to a softening point to effect foaming, and the material is quenched to terminate foaming when the desired degree of foaming has been achieved. As soon as depressurization occurs, the absorbed gas begins to diffuse out of the impregnated plastic. Accordingly, for maximum foaming, the heating of the material to its foaming temperature should take place as soon as possible after depressurization. However, because the gas diffuses most rapidly from the surface regions of the material, an appropriate delay between depressurization and reheating of the material will result in a cellular core with an integral, unmodified laminar skin. Because the skin results from the inherent inability of this surface portion of the material to foam, the skin surface is defined by the extruder, and i.e. thus as smooth as the surface of a corresponding extruded unfoamed sheet. Furthermore, during the subsequent reheating of the sheet to induce foaming, the entire sheet can be heated to its softening or glass transition temperature, whereby the sheet surfaces are free to expand in response to the foaming, i.e., the entire sheet is free to expand in all directions without inducing significant stresses in the sheet to the above-described process.

In contrast, there are basically two other previously known techniques for forming a skin on foamed plastic material. In one of these techniques, the foam surface is reconstituted by using heat and pressure to soften and recompress the surface material, which can be done in the foaming die itself or by a secondary operation. In the other technique, either before foaming, prior to or during the foaming stage, the material is brought into contact with a relatively cool surface, typically within the foaming die; so that the surface of the material is cooled below its foaming temperature before it has foamed and the resulting skin is then stretched by the expanding foam to accommodate the final size of the articles. While both of these techniques are commonly used to provide foamed articles with a very thin cosmetic skin, such a surface is generally not entirely smooth. Furthermore, if either of these techniques is employed to produce a substantially thicker skin, the cycle or processing time can become prohibitively long and the structural integrity of the material is likely to be impaired because of the unequal expansion, contraction and pressures experienced between the skin regions and the cellular core. Additionally, in using either of these two basic techniques, it is very difficult to selectively control the thickness of the desired skin without altering some other parameter that should preferably be determined by other considerations, e.g. extrusion speed or extrusion temperature. Such control is particularly important in the case of relatively thin webs e.g. 10–25 mils which are made of a transparent material in which case it may be critical that the foamed core be sufficiently thick to provide uniform opacity but also that the integral laminar skin be as thick as possible to provide desired physical characteristics.

To distinguish the material produced in accordance with the present invention, which employs the degassing process disclosed in the M.I.T. patent from that produced by the two techniques just described, the term "integral unmodified laminar skin" is intended to characterize the skin as being formed from the same parent material as the cellular core, as opposed to being laminated to the core (integral); to characterize the skin as not having been foamed and then reconstituted as not having been foamed and then stretched significantly at below its softening temperature (unmodified); and, to characterize the skin as having sufficient thickness to comprise a definite lamina, e.g. at least 1 mil (laminar).

While the batch technique of the M.I.T. patent will produce the desired type of skin in an article with a microcellular foam core, it is obviously suitable only for experimental or very limited production purposes and cannot possible be economically viable for the production of commercial quantities of foamed plastic sheet or the like.

An alternative process, disclosed in the same M.I.T. patent discussed above, involves extruding a web of pre-impregnated molten plastic material into a pressurized chamber, in which it passes first through a heated bath that prevents so-called "freezing-off", i.e. adhesion to the extruder die and, then, through a cooling bath, that cools it below its foaming or glass transition temperature. Thereupon, it passes through a pressure seal and into a reheating bath at ambient pressure, which reheats it to an appropriate temperature to induce foaming. The plastic can be impregnated either by previously exposing the plastic pellets to pressurized gas before they are introduced into the extruder or by injecting gas into the molten plastic within the extruder. It should be noted that the term "impregnated" as used herein does not necessarily mean that the cooled material has been completely saturated to the solubility limit when it is initially depressurized, but rather, that a substantial portion of that amount of gas is absorbed or dissolved generally homogeneously throughout the material. Although very desirable from a continuous production standpoint, this technique also suffers from several disadvantages, e.g. the difficulty in threading the initial extruded web along a convoluted pathway through inaccessible pressurized portions of the apparatus, difficulties in controlling tension within the apparatus, and problems associated with sealing the web passageway to prevent leakage of pressurization. More significant, however, is the fact that because the reheating of the web to produce foaming occurs immediately adjacent the exit seal, it is not possible to vary the diffusion of gas out of the material prior to foaming. Accordingly, the finished material has little or no unmodified laminar skin and there is no way in which skin thickness can be controlled except to a limited extent, by varying the extrusion speed and/or the temperature of the foaming medium, either or both of which may be undesirable for other reasons.

A somewhat analogous process for producing foamed extruded plastic material is disclosed in Japanese Patent Kokais Nos. SHO 59(1984)-169824, published on Sept. 25, 1984 and SHO 60(1985)-99629, published on June 3, 1985, both of which are assigned to Mitsubishi Yuka Co., Ltd., Tokyo, Japan. In accordance with these disclosures, a molten resin (e.g. polystyrene) is blended or impregnated with a volatile foaming or blowing agent and is extruded at elevated pressure into a long die. In the portion of the die nearest the extruder, the material is maintained under sufficiently high pressure to prevent foaming as the material is cooled to its optimum foaming temperature while passing along the die. To counteract the frictional resistance caused by the corresponding increase in viscosity of the material, a lubricant is injected between the die surfaces and the adjacent faces of the plastic material. A restriction is preferably employed at the end of the first portion of the die to aid in maintaining the pressure in that die region and, beyond the restriction, the die throat is expanded to define the size of the desired finished product. As the plastic enters the larger portion of the die, it foams and is further cooled to a dimensionally stable temperature before exiting the die, with its passage through the die still being assisted by the previously mentioned lubricant.

Another closely related process, for providing foamed plastic insulation on electrical wire, is disclosed in U.S. Pat. No. 3,988,404, issued Oct. 26, 1976 and assigned to the Furukawa Electric Co., Ltd., Tokyo, Japan. According to this disclosure, plastic pellets are pressurized with a gas in a two stage pressurization process and, while maintained under pressure, the pellets are fed to an extruder through which the electrical wire is drawn. As the material, cooled to its desired foaming temperature, is extruded out of the die around the wire, it foams to provide an insulating layer that is described as having minute and homogenous cells.

In investigating the techniques disclosed in the foregoing patents assigned to Mitsubishi Yuka Co. and the Furukawa Electric Co., Ltd., we have found that smaller, more symmetrical and more uniformly distributed cells appear to be produced by reheating a rod or web of plastic material that was impregnated with gas and cooled to below its foaming temperature before being allowed to foam than by allowing the material, at a foaming temperature, to expand into an enlarged die region or into the atmosphere. More particularly, our observation has been that these latter prior art techniques tend to produce relatively elongate cells that are larger and less uniformly distributed; which adversely affects the physical properties of the finished product. Although other factors may be very significant, it seems likely that this difference in cell size, shape and distribution may be attributable principally to two distinctions between the prior art technique, and the technique to which the present invention is directed, namely that in the latter case the cells are nucleated and grown at a relatively low temperature, which produces smaller cells, and, that the reheating technique allows the material greater freedom to expand uniformly in all directions and thereby avoids internal stresses. It should also be noted that, any skin produced by these processes results primarily from either reconstituting the foam surface or from preventing foaming by chilling the surface of the material before the surface regions have foamed. In other words, such processes are not capable of producing integral unmodified laminar skin.

SUMMARY OF THE INVENTION

The present invention is directed to the continuous production of microcellular plastic web material having integral unmodified laminar skin. In accordance with the invention a web of gas-impregnated plastic material is delivered continuously to a degassing device in which the degree to which gas diffuses out of the surfaces of the web can be selectively and continuously controlled, whereupon the web enters a foaming station where it is reheated to induce foaming. The temperature of the reheated web and the duration of the foaming process prior to quenching are also selectively controllable to produce the desired web characteristics. The gas-impregnated plastic web can be produced initially by any of several novel means including a continuous device for impregnating a previously formed web with gas and several versions of die devices which operate either by rapidly quenching an extruded gas-impregnated plastic material before any significant foaming has occurred or by maintaining the material above its foaming pressure within the die until the material has cooled to below that temperature.

BRIEF DESCRIPTION OF THE DRAWINGS

In the detailed description of the preferred embodiments of the invention presented below, reference is made to the accompanying drawings in which.

DESCRIPTION OF THE ILLUSTRATIVE PREFERRED EMBODIMENTS

Figure 1:
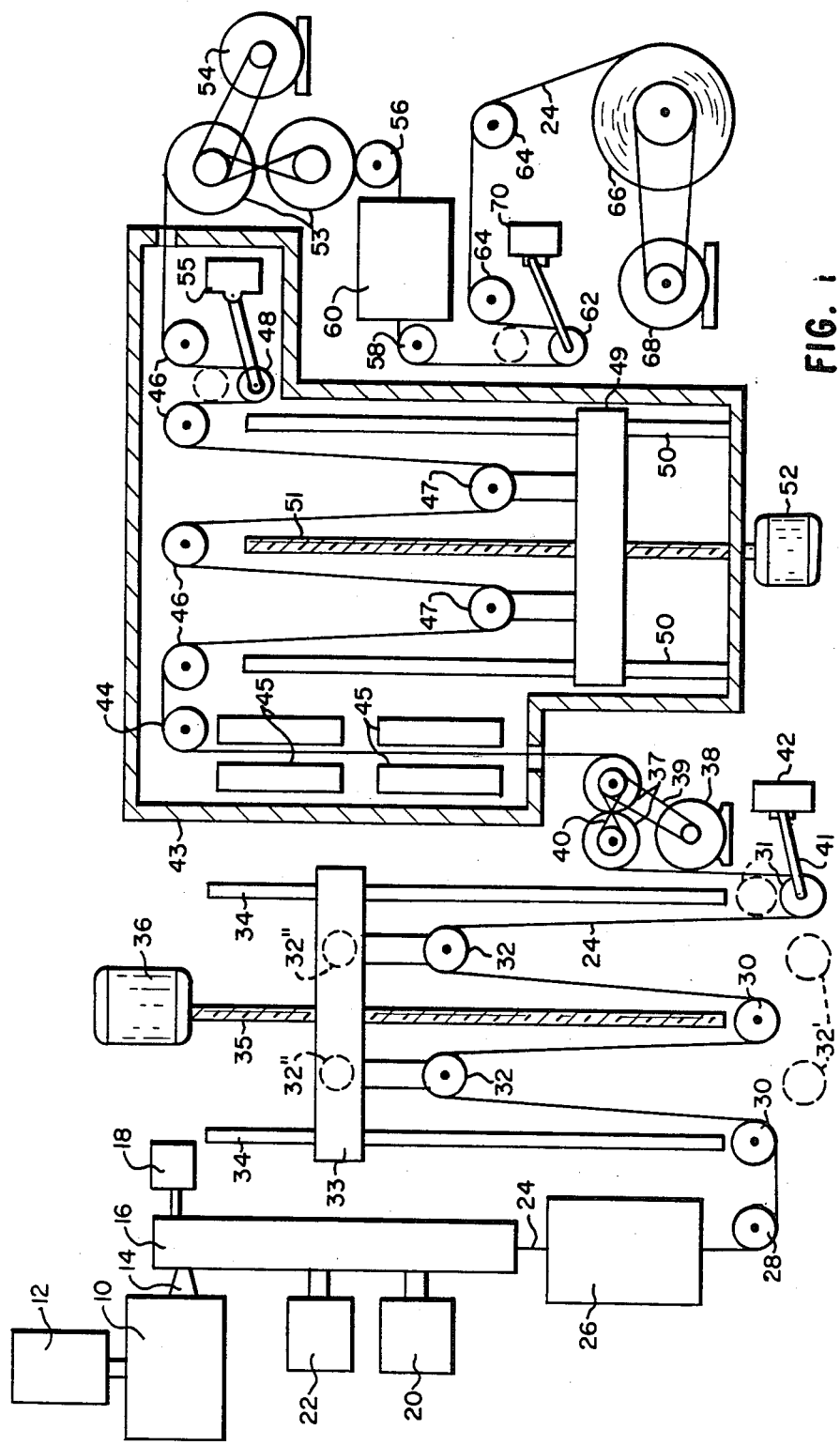
FIG. 1 is a schematic representation of a system comprising a preferred embodiment of the present invention for continuous production of microcellular foam web material.

As shown in FIG. 1, the depicted illustrative system comprises a conventional plastic extruder 10 provided with a feed hopper 12 and connected by a nozzle member 14 to an extrusion die 16. As previously mentioned, the plastic material extruded into and through the die is impregnated with an inert gas (e.g. nitrogen, argon, carbon dioxide, etc.) either by previously impregnating plastic particles or pellets with gas under pressure and maintaining pressurization as they are fed into and stored in the hopper, or by introducing gas into the molten plastic within the extruder itself. Various plastic materials and gases appropriate for use in practicing the invention are disclosed and discussed in the previously mentioned U.S. Pat. Nos. 4,473,665 and in 3,833,625, issued on May 13, 1975 and assigned to the Dow Chemical Company.

The illustrated die 16, is of the type employing a coating fluid, and will later be described in detail with reference to FIG. 2 Briefly, however, the die directs the incoming gas-impregnated molten plastic into the form of a web and cools it to below its foaming temperature before it emerges from the die. Control of temperatures within the die is provided by a heating control unit 18 and a cooling control unit 20. As previously mentioned, a coating fluid is introduced into the die by a pump unit 22 to provide a lubricant, a coolant and/or heat transfer medium and means for sealing and controlling extrusion forces exerted on the web. The coating fluid is preferably glycerine, but alternative coating fluid materials are disclosed in the above-mentioned Japanese Kokai No. SHO 59 (1984)-169824.

Although the term "die" may conventionally imply only that part of a device that initially shapes a material to its desired form, the term "die", as used herein, includes whatever structure is employed beyond the point where the plastic material assumes its desired cross-sectional form to prevent it from foaming by maintaining it under pressure until it has cooled to below its foaming temperature.

Upon emerging from the die, the web, designated by numeral 24, enters a washing unit, depicted at numeral 26, which removes the coating material from the web and which may also serve to further cool the web. This unit can include nozzles for spraying water on both surfaces of the web to dilute and wash away the coating material and to cool the web and appropriate squeegee blades, rollers, suction nozzles, etc., to remove the water and diluted coating material from the web. Because similar units are well known in the web cleaning art, further details are unnecessary for understanding the present invention; typical analogous units of this type being shown, for example, in U.S. Pat. Nos. 3,158,886 and 4,244,078. if no coating material is used, as in the connection with FIG. 4, the washing station is unnecessary and may simply be eliminated.

Beyond the washing unit, the web is diverted by guide roller 28 to a degassing control device comprising fixed rollers 30, tension control roller 31 and movable rollers 32, the latter being supported on frame 33 which is slideably carried by guide rods 34. Lead screw 35, selectively driven by motor 36, can move frame 33 and thereby rollers 32 between the extreme positions shown in broken lines at numerals 32' and 32". Accordingly, the position of frame 33 determines the length of web material that is present in the degassing apparatus, which, in turn, allows variation of the extent to which gas can diffuse out of the web and into the atmosphere between the die and the foaming station, which is discussed below. Although not shown, radiant heaters or the like can also be employed in the degassing control device, if desired, to selectively increase the rate at which the gas diffuses out of one or both faces or the web. However, because the fragility of the web increases as it is heated, it is preferable that it not be heated to near its foaming temperature any earlier than is necessary.

Beyond the tension control roller, the web passes around a pair of drive rollers 37, which are driven by motor 38 in opposite directions as illustrated schematically by motor belt 39 and crossed belt 40. The tension control roller 31 is mounted by one or more arms 41 to a sensing unit 42 and is movable between the positions shown in solid and broken lines, as a function of the tension in the web. The speed of motor 38 is controlled by sensing unit 42, thus maintaining the web under a selected degree of tension. This schematically depicted control means is only representative of many devices that are well known in the tension control art and that could be employed in this environment.

Beyond the drive rollers, the web travels upwardly into enclosure 43 of the foaming station, where it is guided by roller 44 between confronting radiant heaters 45 or equivalent heating devices, which bring it quickly to its desired foaming temperature to initialize foaming. The heated web, in the process of foaming and thereby expanding in all directions, is then guided around fixed rollers 46, movable rollers 47 and tension sensing roller 48, which are at approximately the same temperature as the web because of conduction of heat from the web to the rollers. The movable rollers 47 are carried by a frame 49 slideably supported on guide rods 50 and adjustable by screw 51 driven by motor 52, to provide selective regulation of the length of the foaming path, in the same manner previously described in connection with the degassing device between the die and the foaming station. This arrangement allows control of the extent to which foaming has occurred before the web leaves enclosure 43 and encounters chill or quench rollers 53, which rapidly cool the web to below its foaming temperature, thus terminating foaming.

The chill or quench rollers 53 are driven in opposite directions by motor 54 and are internally cooled by circulating liquid to cool the web rapidly from both faces. Obviously, other cooling means could be employed in conjunction with or as alternatives to the liquid cooled rollers. Motor 54, driving rollers 53, is controlled by sensing unit 55 and its tension sensing roller 48, in the same manner previously described in connection with sensing roller 31, and thereby maintains the hot and softened web under constant but very low tension between drive rollers 37 and chill rollers 53, while completely isolating that portion of the web from tension influences elsewhere in the apparatus.

Because of the fragility of the expanding web in the foaming station, the rollers 44, 46, 47 and 48 are preferably driven by so-called tendency drives, which impart only enough torque through the rollers to maintain their required rotational velocity without significantly tending to either retard or accelerate the web. Although many ways of providing such a drive are well known, a convenient expedient is to support such a roller by antifriction bearings on a shaft that, in turn, is rotated just slightly faster than the desired roller speed, so that the antifriction bearings transmit enough torque to the roller to maintain its rotation but cannot transmit any significant forces from the shaft to the web or vice versa. In the case of the sensing roller 48, the roller shaft could be tendency driven in this manner by a flexible shaft or by a belt with its other pulley concentric with the pivot axis of the roller support arms. Alternatively, the web might be supported in the foaming station by air bearing means rather than by rollers. If heated rollers are employed instead of or supplementary to the radiant heaters 45, such rollers should also preferably be tendency driven. As previously mentioned, the tension sensing arrangement employing roller 48 is only representative and other analogous devices are well known that completely eliminate this concern and that impose substantially no tension on the web. For example, the web can simply be allowed to hang in a loop between two tendency driven rollers and the position of the loop can be monitored by one or more photodetectors.

Below the chill rollers, the web is guided by rollers 56 and 58 through a final cooling station 60 in which cold air or other conventional cooling means are used to cool it to substantially ambient temperature. Thereupon, the web is looped under tension control roller 62 and is guided by rollers 64 to a take-up roll 66, driven by motor 68. As previously described, in connection with motors 38 and 54, motor 68 is controlled by sensing unit 70 associated with tension control roller 62 so that the web is wound on the take-up roll under substantially constant tension, independent of the web tension in other parts of the apparatus. Preferably the roll is wound relatively loosely so that any gas remaining in the web material will diffuse out of the plastic to the atmosphere, thereby insuring that no further foaming will occur if the web is reheated in a subsequent thermoforming operation.

It should be understood that FIG. 1 is a schematic representation of means for practicing the present invention and that there is not necessarily any direct correlation between specific illustrated features and the corresponding features of an actual production apparatus. For example, the illustration may differ from an actual installation with regard to specific types and relative sizes and locations of components, the direction of web movement at various locations, and the relative lengths of web materials at various stages of the processing operation. Also, it should be apparent that, although not illustrated or specifically described, various sensing devices can be employed at different locations to sense conditions such as web temperature, web velocity, web tension, web expansion, web density, die pressures and temperatures, etc., and that data from such sensors can be used to provide continuous automatic control of various process parameters to produce a finished product having predetermined characteristics.

Figure 2:
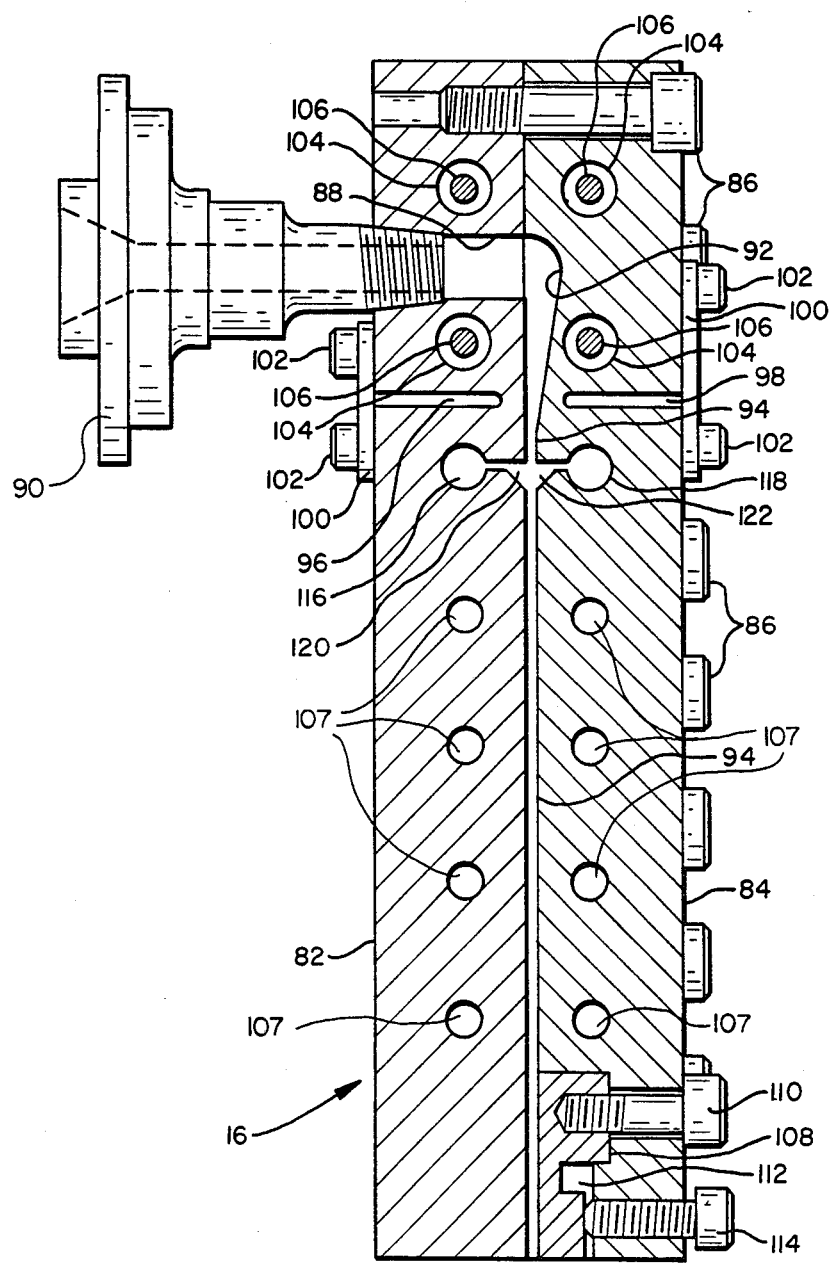
FIG. 2 is a somewhat schematic cross-sectional view of an extrusion die according to one preferred embodiment of the invention.

The illustrative die 16 shown in FIG. 2 comprises two accurately machined die plates 82 and 84 that are bolted together along their top and edge margins by a plurality of bolts or cap screws 86. The die plate 82 is provided with an inlet port 88 into which is threaded a nozzle member 90 that delivers gas-impregnated molten plastic to the die from an extruder. Opposite port 88, die plate 84 is recessed to define a transition cavity 92 that directs the plastic material into an elongate web forming die passageway 94, which is provided by a shallow slot in die plate 84.

Near the lower portion of the transition cavity, the die plates 82 and 84 include respective thermal barrier slots 96 and 98, which serves to reduce thermal conductivity of the die plates between the portions of the die above and below those slots. Stiffening plates 100, connected to the die plates by bolts 102, span the thermal barrier slots to avoid undesirable weakening of the die by the slots.

Above the thermal barrier slots, the die plates include passageways 104 which are provided with electrical heating elements or cartridges 106 fr heating the upper portion of the die. Alternatively, such heating can be achieved by circulating hot oil or the like through these or similar passageways. In either event, the temperature of the heated portion of the die is controlled by heating control unit 18, shown in FIG. 1, to thereby control the viscosity of the plastic material in the transition cavity, so that it flows smoothly and evenly into the web forming passageway. Below the thermal barrier slots, the die plates are provided with coolant passageways 107, through which coolant of a controlled temperature and volume is circulated by cooling control unit 20, shown in FIG. 1, to cool the molten plastic to below the temperature at which foaming will occur, before it emerges from the die. Toward the bottom of the die, die plate 84 is notched to receive an insert plate 108, that is held in place by mounting screws one of which is shown at numeral 110. The inner face of the insert plate is normally co-planar with the adjacent passageway face of die plate 84 and the insert plate is weakened by a transverse slot 112 so that it can be deflected inwardly by adjusting screws, one of which is shown at numeral 114. This adjustment allows the thickness of the passage to be selectively reduced at its lower end to restrict the flow of coating fluid out of the die.

To lubricate the web, to provide a heat transfer medium between the web and the die, and to provide a sealing medium, a coating fluid, such as glycerin, is introduced through fluid inlet passageways 116 and 118, which are connected to an appropriate external manifold or the like, not shown. The fluid is supplied from pump unit 22, shown schematically in FIG. 1, which includes a high pressure pump and temperature control means. Passageways 116 and 118 communicate respectively with distributor slots 120 and 122 in the die plates to distribute the fluid transversely across the respective faces of the web. Because the glycerin or other cooling fluid is of substantially lower viscosity than the plastic material, we have found that the fluid tends to migrate laterally toward the edges of the moving plastic material, thus providing a scarcity or absence of fluid along the center portion of the web below the fluid inlet slots. To counteract this tendency, the distributor slots are made wider toward the center of the web so that more coating fluid is delivered to the center of the web then to its edges. If desired, supplemental coating fluid openings can be provided along the center of the passageway 94 to provide additional coating fluid, as needed. The coating fluid pressure is selectively controllable and is normally regulated to be slightly higher than the pressure of the plastic material at the distributor slots, thus insuring positive introduction of the fluid into the die and onto the faces of that material. Typically, when the plastic material emerges from the transition cavity and begins to be cooled, it shrinks slightly in thickness and width, which, augmented by compression of the material by the coating fluid, provides room in the die passageway for the coating of fluid on the surfaces of the solidifying web. However, the passageway can be made slightly thicker and wider below the fluid inlet slots to increase the thickness of the coating fluid layer or the passageway can be tapered slightly, both in thickness and width, if such a profile proves advantageous.

Because of the several functions performed by the coating fluid, the optimum performance by the extrusion process requires proper balancing of a number of parameters. Briefly, the primary factors that must be considered in this regard are: (1) Because in this type of die the plastic web material must be cooled below its foaming temperature before emerging from the die, it is substantially solidified within the die passageway 94. Accordingly, lack of lubrication in the lower die section can cause adherence of the material to the die and/or sufficient frictional resistance to overcome the injection pressure, thereby either completely or partially plugging the die; (2) If the solidifying web experiences depressurization within the lower passageway before it is adequately cooled, foaming can be initiated within the die; and (3) If the coating fluid layer is too thick, the fluid will emerge from the die at greater velocity than the web and, because of viscous drag, will tend to stretch or possibly tear the solidifying web within the die. The interrelation of these and other less apparent factors is obviously very complex; for example, the lubricating, sealing and viscous drag effects of the cooling fluid are related to its viscosity, which is a function of its temperature, which in turn is influenced by the initial temperature of the injected plastic material, by the injection rate, by the heating and cooling of the different portions of the die and by heat transfer consideration. However, we have found that there is substantial latitude in balancing these factors and that high-quality foam material can be produced, even without continuous automatic control means, which, of course, are desirable for actual production operations.

To initiate the extrusion process, the upper portion of the die is heated but no coolant is employed in the lower portion so that the latter is warmed by conduction. Then, the glycerin or other coating fluid is introduced into the die and allowed to flow out the bottom before molten plastic material is injected into the die. Initially, either ordinary plastic particles or pellets are fed into the extruder or, if a gas injection system is used, it is not yet activated. After web material is emerging from the die, pellets that were previously impregnated with gas are fed into the hopper or the gas injection system is activated, whereupon the coolant system, the pump unit and the lower die insert are adjusted until a satisfactory web of unfoamed gas-impregnated material is being produced. Once these adjustments have been determined for a particular type of plastic, the start-up operation can be repeated with minimum inconvenience or delay.

When the die is producing a satisfactory gas-impregnated web, the latter is cut off and threaded through the various stages of the complete system previously described, thus completing the start-up process.

Figure 3:
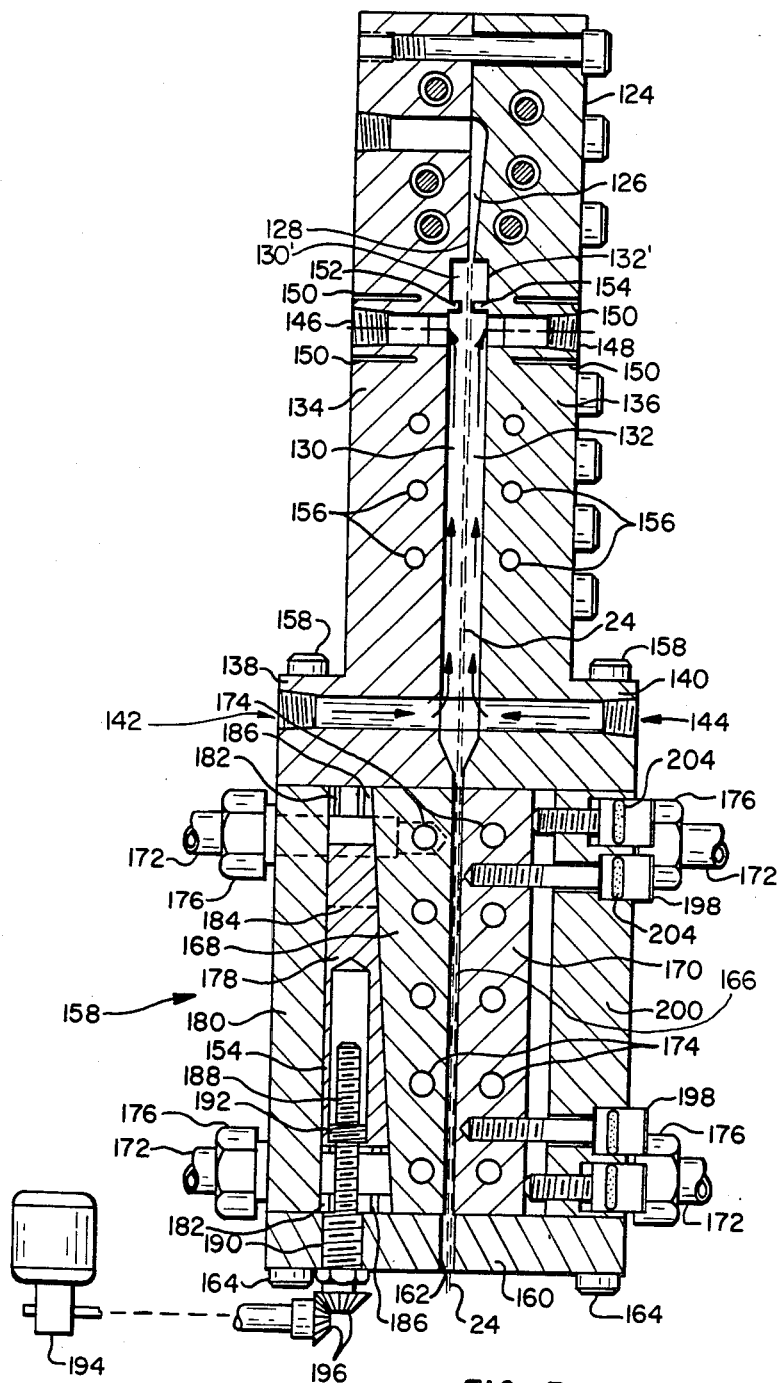
FIG. 3 is a view corresponding to FIG. 2 but showing a die according to an alternate preferred embodiment of the invention.

The illustrative die shown in FIG. 3 includes a heated upper portion 124, which is similar to the corresponding portion of the prevously described die, including a transition cavity 126 terminating in a passageway throat 128 that defines the thickness and width of the extruded web. Toward the lower end of the heated upper die portion, and below throat 128, the passageway for the plastic material is enlarged so that the faces of the plastic web, shown in broken lines at numeral 24, are spaced from the confronting die faces by a much greater distance than in the corresponding region of the previously described die, thereby providing the opposed coolant chambers 130 and 132. At their lower ends, the two die plates 134 and 136 include respective integral lips 138 and 140 that cooperate to define a flange by which the die plates are bolted to a sealing unit, described in further detail below, in which the web passageway closely conforms to the web to reduce leakage of fluid around the web and to control hydraulic forces exerted on it.

The glycerin or other coating fluid is introduced into chambers 130 and 132 through respective inlet ports 142 and 144, which are piped to the output of a pump and temperature control unit as depicted at numeral 22 in FIG. 1. Below the heated die portion, corresponding outlet ports 146 and 148 communicate with the respective chambers 130 and 132 and are piped to return fluid to unit 22. As previously described, slots 150, are provided in the die plates to reduce thermal conductivity between the heated and cooled portions of the die. As shown by numerals 130' and 132' the coolant chambers 130 and 132 extend above the outlet ports beyond respective ribs 152 and 154 which partially restrict the passage of fluid between the upper or transition portions of the chambers above the ribs and the lower or positive flow portions of the chambers below the ribs.

As the plastic material passes between the coolant chambers, glycerin or an equivalent coolant is pumped upwardly through the chambers under sufficient pressure to prevent foaming and at an appropriate temperature to provide the required cooling of the web. The corresponding portions of the die plates are provided with passageways 156 for a controlled-temperature flow of cooling fluid, from cooling control unit 20, which cools the die plates and also contributes to cooling the coating fluid. It should be apparent, however, the the actual cooling of the plastic material is attributable primarily to the circulating fluid within the chambers, which, in this region, is functioning principally as a coolant, in the conventional sense of the word, rather than as a medium for transferring heat to cooled portions of the die.

Because of the partial isolation of the upper portions 130' and 132' of the respective chambers 130 and 132, by ribs 152 and 154, the fluid therein is relatively static or stagnant, i.e., it is not being positively circulated. Accordingly, by absorbing heat from the plastic and the adjacent portions of the heated upper die unit, this fluid becomes considerably hotter than that in the lower portions of the chambers and thus prevents the throat region of the die from being cooled sufficiently to cause the plastic to solidify prematurely and thereby adhere to or plug that portion of the die. If necessary, the upper chamber portions 131' and 132' can be provided with venting means to allow vapor emitted by the plastic material to be bled out of the die.

The sealing unit, below the cooling chambers, serves to maintain the web material under pressure, to further cool it, to prevent excess leakage of the fluid and to control hydraulic forces exerted on the plastic material. These considerations are essentially analogous to those described in connection with FIG. 2, but, in this case, the force controlling requirements are more stringent because the web material above the seal unit is essentially unconstrained. This implies, for example, that the hydraulic forces exerted on the plastic within the seal, i.e. the piston effect of the cross-section of the plastic material and the viscous drag forces exerted by the coating fluid, must be controlled relative to the extrusion rate so that sufficient tension is applied to the unsupported material to draw it through the die, so that it does not accumulate in the chambers by buckling under compression, while also insuring that the material between the chambers is not torn or stretched excessively. Also, because the web is only partially solidified in the chamber region, it is difficult and inconvenient, during start-up, to deliver the leading end of the web into and through a seal passageway of fixed dimension, even if the web is formed of impregnated plastic. Accordingly, the illustrative sealing unit provides a sealing passageway of variable thickness dimension, that can be opened to facilitate initiating the extrusion process and then adjusted to achieve optimum performance.

The sealing unit comprises a rectangular open-top box structure bolted to the flange at the lower ends of the die plates by bolts 158. The bottom plate 160 of the box structures includes a relatively wide exit slot 162 and is bolted to the walls of the box structure by bolts 164. The web passageway 166, through the sealing unit, is defined between the confronting faces of plate 168, which is readily movable to vary the passageway thickness dimension and plate 170, which is capable ot being manually adjusted but which normally is not disturbed once its position has been established for a particular extrusion operation. The edges of plates 168 and 170 are closely fitted to the confronting internal surfaces of the box structure and the die plate flange to substantially preclude leakage of fluid between those surfaces. Coolant conduits 172 communicate with coolant passageways 174 in plates 168 and 170, which are interconnected by other plate passageways, not shown, to allow coolant to flow in a serpentine path through the plates. The conduits 172 are connected by flexible hoses or the like to the cooling control unit and extend slideably through seals or glands 176 in the sealing unit which allow the conduits to move axially to accommodate corresponding movement of the plates 168 and 170.

Adjusting wedge 178 is maintained against sealing unit wall 180 by tongues, not shown, which are received in corresponding grooves 182 in the front and rear walls of the seal unit to allow the wedge to move upwardly and downwardly in contact with wall 180. Slots in the upper and lower edges of the wedge, indicated by broken lines 184, accommodate the corresponding coolant conduits to prevent them from interferring with the movement of the wedge. The tapered inner face of wedge 178 is maintained in contact with the correspondingly tapered outer face of plate 168 by L-shaped tongues 186 on plate 168, received in mating slots in the wedge, not shown, which are parallel to its tapered face. Because plate 168 cannot move upwardly or downwardly, such movement of wedge 178 causes plate 168 to move toward or away from plate 170, to vary the passageway gap. In the illustrated embodiment, this adjustment is accomplished by means of an adjusting screw 188 passing through a thrust-bearing seal 190 and threaded into bushing 192 in the wedge member. The screw, in turn, is connected to a gear reduction motor or an equivalent device, as shown schematically at numeral 194, for example, by bevel gears 196. Thus, the passageway adjustment can be controlled from a remote location or can be effected by an automatic control device.

To adjust the position of plate 170, bolts 198, located in two or more rows, extend through sealing unit wall 200 and are threaded into plate 170 and similarly located bolts 202, are threaded through wall 200 and abut against plate 170. As shown at numeral 204, the shanks of both types of bolts are provided with sealing rings 204, to prevent leakage of the coating fluid. Accordingly, by appropriate adjustment of the bolts, plate 170 can be moved toward or away from plate 168 and can be tilted slightly, if desired, to locate it parallel to that plate or to intentionally provide a slightly tapered passageway.

Although not illustrated, additional coating fluid can be provided to plates 168 and 170 by appropriate conduits provided with packing glands corresponding to glands 176. It should be noted that a slight amount of leakage of the coating fluid can occur around the edges of plates 168 and 170, but this is actually beneficial in that it hydraulically balances forces exerted on the opposite sides of those plates so that the flatness of the plates is substantially independent of any distortion of the box-like die housing.

It should be noted that the illustrative sealing unit can also be used in connection with the previously described process for preparing microcellular foam by pressurizing a preformed sheet or web in a pressure vessel, in which case such a seal can be used in conjunction with appropriate coating fluid supply means for conducting a sheet or web into and/or out of such a vessel.

The start-up procedure for this die construction is generally similar to that previously described in connection with the die shown in FIG. 2. After the passageway of the seal unit has been fully opened, sufficient coating fluid is admitted to coat the faces of the seal plates and molten plastic that is not impregnated with gas is then extruded out of the upper die unit to form a web that moves downwardly, assisted by gravity, and passes through the open seal unit. Thereupon, the sealing unit is gradually closed and the rate of flow of the coating fluid is simultaneously increased until the desired condition is achieved, whereupon the gas-impregnated pellets are fed to the extruder or the impregnating gas is introduced into the extruder and final adjustments are made to optimize the quality of the cooled gas-impregnated web emerging from the seal unit.

The two die arrangements described above both operate on the principle of maintaining the gas-impregnated extrusion at a sufficient pressure to prevent foaming until after it has cooled to below foaming temperature, which is the same basic principle disclosed in the previously mentioned U.S. Pat. No. 4,473,665. As opposed to this principle, the embodiment shown in FIG. 4 relies on our discovery of an entirely different and unexpected phenomenon, namely that the gas-impregnated material, which is pressurized above its foaming pressure within the extrusion die, can be extruded into atmospheric pressure at its foaming temperature and can nevertheless be prevented from foaming if it is quickly cooled to below its minimum foaming temperature. Notwithstanding theoretical explanations of the mechanism by which the foaming takes place, as described for example in the U.S. patent just mentioned, it is doubtful that this mechanism is fully understood. However, it seems reasonable to conclude that this process is possible because the finite time required for the internal gas to migrate to the nucleation sites after depressurization and to initiate foaming is of sufficient duration to allow the relatively thin web or the like to be cooled throughout to below its foaming temperature before foaming commences or, at least, before any significant degree of foaming has occurred. A corollary to this concept is the fact that the gas tends to diffuse out of the sheet very rapidly at the extrusion temperature, but the rate of such outgassing is greatly reduced as soon as the outermost layers are cooled sufficiently to provide a barrier to the escape of the gas.

Figure 4:
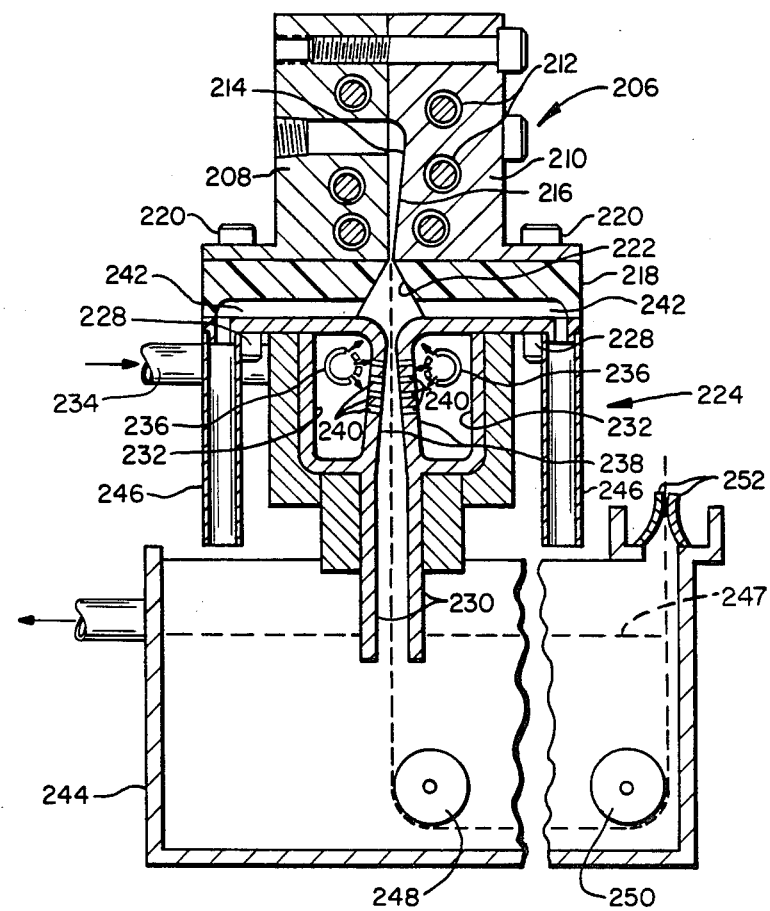
FIG. 4 is a somewhat schematic cross-sectional view of a combined die and quenching device according to still another preferred embodiment of the invention.

To carry out this process, the illustrative embodiment of the invention shown in FIG. 4 includes a die member 206, substantially identical to the upper die portions shown in FIGS. 2 and 3, comprising die plates 208 and 210, heating passageways 212 and a transition cavity 214 terminating in an extrusion passageway or throat 216 that defines the desired cross section of the extruded material. Below die member 206, an insulating plate 218 is attached to the die member by bolts 220 and is provided with a tapered opening 222 communicating with extrusion passageway 216 but insulating the face of the die member surrounding that passageway. The insulating plate 218 also serves to support a cooling or quenching unit 224, attached to plate 218 by bolts 228. The quenching unit comprises a rectangular inner tube 230, the walls of which are spaced from both the faces and the edges of the extruded material passing through the unit. The upper portion of tube 230 is provided with opposed chambers or manifolds 232, which receive refrigerated coolant, preferably water, at regulated temperature and pressure from the cooling control unit 20 shown in FIG. 1; through conduit 234 and through slotted distribution tubes 236. As shown at numeral 236, the cooling or quenching unit is provided with an insulation coating to minimize heating of the unit by the surrounding atmosphere. Because only relatively low coolant pressures are encountered within the cooling unit, it need not be constructed to withstand high pressure, as in the case of the cooling portions of the previously disclosed embodiments.

The walls 238 of the illustrative inner tube 230 are sloped to provide a tapered passageway and are provided with downwardly directed slots or nozzles 240 through which the refrigerated coolant is directed into contact with the corresponding faces of the plastic material. The size of the slots in relation to the coolant flow rate is such that the passageway is substantially filled with coolant, which flows freely out of the bottom end thereof, and the use of a plurality of slots or nozzles helps to agitate the coolant in contact with the plastic material to improve the rate of heat transfer so that the material is chilled throughout to below its foaming temperature as quickly as possible.

As mentioned earlier, it is important that the surfaces of the die adjacent the extrusion opening not be in contact with the coolant to avoid contamination or plugging of the passageway. Accordingly, the insulating die plate is provided with drainage passageways 242, which, in cooperation with the downwardly directed coolant flow produced by the slots, or nozzles 240, prevents the coolant level from rising above the drainage passageways, thus insuring that there is always an air space adjacent the die. Any fluid passing through passageways 242 drains into coolant pan 244, through appropriate conduits 246.

Preferably, the plastic material is cooled to below its foaming temperature before emerging from tube 230 but it nevertheless may still be within a temperature range at which it is quite fragile or at which diffusion of gas out of its surface may take place more rapidly than desired. Consequently, the lower end of tube 230 extends slightly below the coolant level, shown by broken line 247 in pan 244. The plastic web is guided through the coolant in the pan by rollers 248 and 250 before it is directed upwardly out of the coolant beyond roller 250. If the coolant employed must be subsequently removed from cooled web, e.g. a coolant other than water which might be employed to lower the coolant temperature below 0° C., the web is then directed through a cleaning station as previously described in connection with FIG. 1. However, if water is employed as a coolant, it can be removed simply by wiper blades 252 or by equivalent means and the washing station is not needed.

Because the successful performance of this embodiment of the invention depends on the rapidity with which the self-insulting plastic material can be cooled to below its foaming temperature, its use is limited by the cross-section of the extruded material, but, with a web of high impact polystyrene approximately 10 mils thick, impregnated with Nitrogen and extruded at a temperature of approximately 420° F. and an extrusion velocity of 6 to 8 inches per second, we have achieved good results by simply extruding the material into a bath of cold water (approximately 50° F.) with a distance between the die lips and the water bath of about 0.125 inches. By increasing the extrusion velocity which thereby correspondingly increases the length of the path available to cool the extruded material, it is apparent that substantially thicker material can be satisfactorily cooled. Also, it should be obvious that many known cooling techniques might be employed, alone or in combination to achieve faster heat transfer, e.g. ultrasonic agitation of a cooling fluid, gaseous cooling, electrostatic cooling as described in U.S. Pat. No. 3,224,497, etc. Similarly, it should be recognized that the cooling means need not be integral with or directly connected to the die structure but that a conventional die could be used to extrude the plastic material into a quenching bath or other cooling device. Although a slight amount of foaming may occur in the core of the web, because of the temperature gradient of the cooling through the thickness of the web, this does not negate the concept of producing an "undisturbed" skin because the entire web is reheated to at least the softening point of the plastic during the foaming process, thus relieving whatever slight strain may be present as a result of such relatively insignificant initial foaming.

The start-up procedure for the process just described does not require the initial extrusion of plastic material free of gas, but can be carried out simply by extruding the gas-impregnated material from the die into the cooling unit, which is supplied with coolant prior to commencement of the extrusion process. If desired, however, the previously described two-stage procedure may be employed to insure against premature foaming, e.g. because of low initial extrusion speed or high initial material temperature.

With regard to the relationship between cooling rates and the material thickness, an interesting variation of this technique is its use in forming an insulating coating on a wire, e.g. as disclosed in the previously mentioned U.S. Pat. No. 3,988,404. In this variation, the wire fed through the annular die is itself precooled to a substantially low temperature and is insulated from the die by an insulating sleeve so that it absorbs heat inwardly from the plastic material extruded around it, which is also cooled externally by a cooling bath or the like, as discussed above. In this way, a relatively heavy layer of gas-impregnated plastic material can be coated on the wire and can subsequently be reheated to provide a correspondingly thick coating of foamed insulation with an external skin of desired thickness.

As previously mentioned, rather than being directly extruded from a die, the gas-impregnated web can be provided by exposing a previously formed non-impregnated web to gas under high pressure for a sufficient period of time to allow the gas to impregnate the web. To carry out this procedure in a continuous production process, the web is feb through a pressurizing chamber which contains a suficient length of the web to insure that the desired degree of gas-impregnation occurs during the time required for an increment of the web to pass completely through the chamber. Such an arrangement is obviously much less economical than direct extrusion of the gas-impregnated web if the thickness of the web dictates a long exposure to the pressurized gas, and particularly if the web is relatively wide and moving relatively rapidly. However, such an arrangement is practical for use with relatively thin webs, particularly if narrow widths and relatively low production quantities are involved, and can simply be substituted for the die device depicted in FIG. 1.

Figure 5:
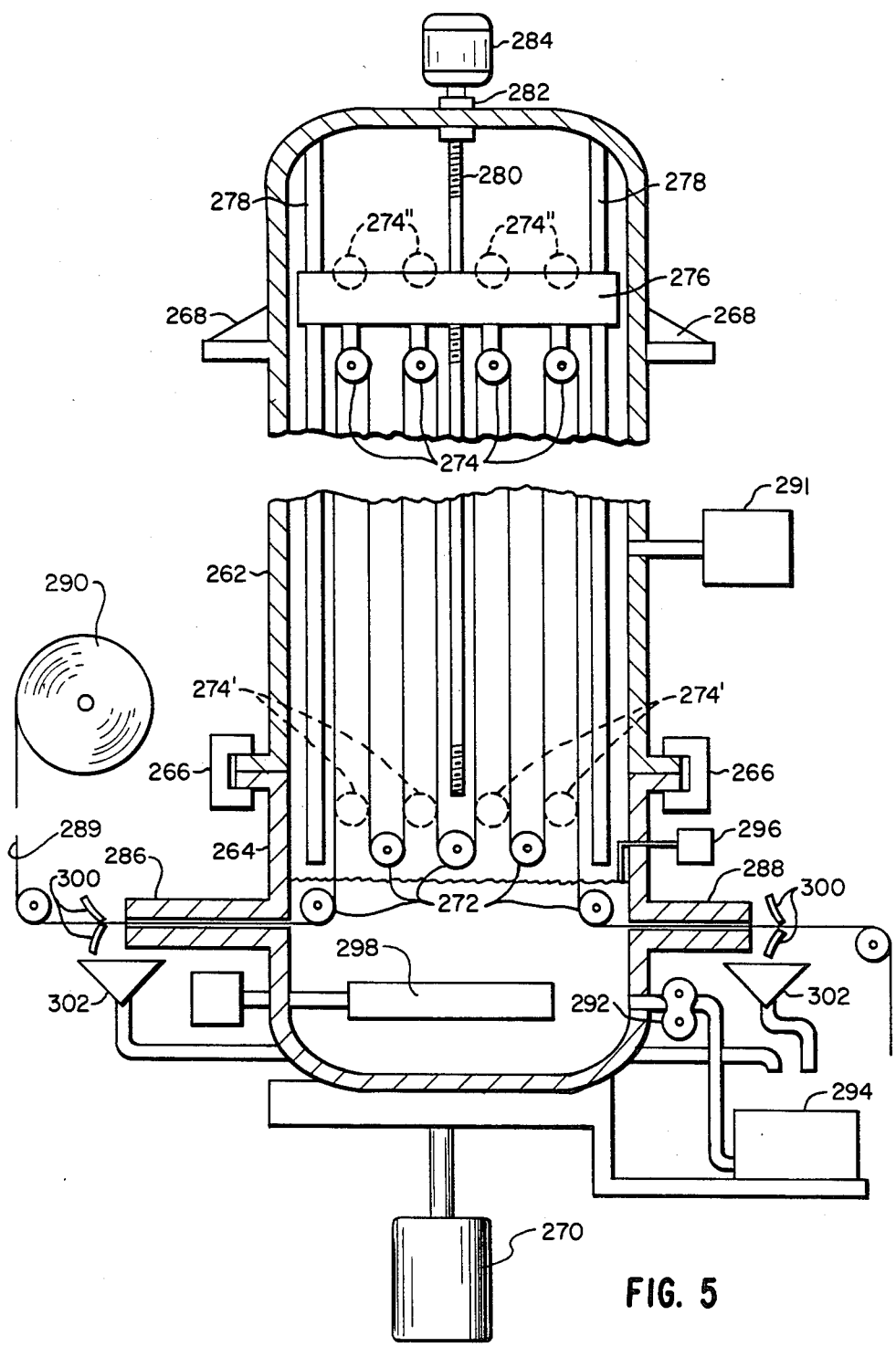
FIG. 5 is a somewhat schematic cross-sectional view of a pressure vessel device for impregnating a previously formed web of plastic material.

The illustrative pressuring device shown in FIG. 5 includes a pressure vessel having an upper unit 262 separably connected to a lower unit 264 by clamping means schematically shown at 266. The upper unit is supported by brackets 268 and the lower unit is supported by a hydraulic jack or the like, shown at 270; thus allowing the lower unit to be lowered away from the upper unit after the two units are released from one another.

The lower unit includes a plurality of parallel fixed rollers 272 and the upper unit includes a plurality of parallel movable rollers 274 carried by a frame 276 slideably supported by guide rods 278. A screw 280, extending through a seal 282 and driven by motor 284 allows the movable rollers to be moved relative to the upper pressure vessel unit between the lower and upper positions respectively shown in broken lines at numerals 274' and 274".

A pair of opposed seals 286 and 288 are located at opposite sides of the lower unit and, although depicted schematically, in FIG. 5 are substantially identical to the adjustable sealing unit in FIG. 3. The previously gas free web 289 is fed into the pressure vessel from supply roll 290 through inlet seal 286 and is trained alternating around rollers 272 and 274 to establish a long serpentine path of a desired length within the pressure chamber before the web emerges from the pressure chamber through outlet seal 288, whereupon it is selectively degassed, foamed and cooled, as previously described. Pressurized gas is delivered to the pressure chamber by a pump or the like 291 and a sealing and lubricant fluid, such as glycerine, is supplied to the lower unit by a pump 292 from a reservoir 294. During operation, the level of the sealing and lubricant fluid in the lower unit is maintained above the level of seals 286 and 288, for example by a level sensing device 296 that controls the operation of pump 292, and the temperature of the fluid is controlled by a heater element 298. Accordingly, as previously described, some of the sealing and lubricating fluid escapes from both seals in this process of performing its sealing and lubricating functions. This escaping fluid is substantially removed from the web by wiper blades 300 and is caught in pans 302, from which it is returned to reservoir 294. Any fluid remaining on the outgoing web can be removed by the washing device 26, previously described.

To initiate the pressurizing process, pump 292 is turned off to allow the fluid to drain out of the lower unit and to the reservoir through the seals, so that the fluid level is at the level of the seal passageways. The clamping means 266 are then released and the lower unit is moved downwardly by jack 270. Frame 276 is then moved to its lowermost position of motor 284, thus allowing the end of the web to be threaded through seal 286, alternately under and over rollers 272 and 274, through seal 288, and then through the wash station 26 and remainder of the apparatus shown in FIG. 1. Thereupon, the lower unit is raised and sealed to the upper unit, pump 292 is energized to raise the fluid to its desired level, seals 286 and 288 are adjusted as required and pump 290 pressurizes the pressure vessel. The frame 274 is then raised as required to provide the desired length of web within the pressure vessel and the web is drawn through the device of motor 38, shown in FIG. 1.

Because the pressure in the pressure vessel tends to extrude the web outwardly through both seals, considerable tension may develop in the web, particularly if it is relatively thick and relatively high pressure is used. If such tension is a problem, drive rollers can be employed within the lower unit, driven through rotary seals, to isolate this tension to those portions of the web immediately adjacent the respective seals 286 and 288. Also, the depicted device can be provided with means for detecting a splice in the web and for automatically opening each seal at the proper time to allow the splice to pass through.

For experimental purposes, or if any limited amount of foamed web of a particular type is required, a pressurizing device similar to that shown in FIG. 5 can be adapted to receive a rotatably supported roll of plastic web material, which can be withdrawn from the pressure vessel through a seal similar to seal 288. The roll is preferably wound relatively loosely and is exposed to pressurized inert gas to impregnate the entire roll before the web is withdrawn and further processed as previously described.

In a typical example of the invention, a continuous web of Monsanto 4300-300, super high impact polystyrene, approximately 0.0150 inches thick with a material density of 1.06 grams per cubic centimeter, was formed by means of a conventional plasticating screw extruder extruding the polymer melt into a polished chrome three roll stack.

The continuous web was wound into a roll and was then placed into a pressure vessel, which was then sealed and pressurized to 300 pounds per square inch with 99.8% pure argon gas at a temperature of 80° F. The continuous web was held in this environment for 80 minutes, sufficient time for the web to absorb 99.9% of the saturated gas concentration. The web was then taken out of the pressurized environment by unwinding the roll through a seal similar to those previously described at 20.0 feet per minute, thus allowing the remaining wound web to remain in equilibrium with the high pressure environment. The sealant used was glycerine.

The resulting web, which was supersaturated with gas at ambient conditions, was passed through a washing station and then threaded through a degassing device which accommodated 17.1 feet of web between the washing station and the foaming station. This length of web required 51 seconds to traverse the length of the degassing path, i.e. 17.1 feet. Upon entering the foaming station the web was S-wrapped about two 8 inch diameter oil heated rolls at a temperature of 236° F. The seb contacted the oil heated roll surfaces for 24 inches, giving a total contact time of 6.0 seconds. The onset of foam growth was evident as the web departed the second heated roll; the web's surface temperature at this point being 228° F.

Beyond the heated rolls and prior to the cooling station, 12.4 feet of web are accommodated in the foaming station, allowing approximately 28 seconds for the desired foamed structure to develop. The interior of the foaming station contained circulating air at 264° F. The circulating air heated the web at a slow rate giving very little temperature gradient in the web to allow for controllable foam growth. Coming out of the foaming station, the velocity of the web was 25.9 feet per minute, which reflects the lengthwise expansion of the web during foaming. Upon exiting the foaming station the foam growth was stopped by cooling the web. This was done by passing the web over two 6 inch diameter chill rolls at a temperature of 200° F. and passing the web through ambient air.

The resultant foamed web was 0.0177 inches thick with an overall material density of 0.60 grams per cubic centimeter. The web had unfoamed solid surface skins of 0.0011 inches on both surfaces and a 0.0155 inch uniformly foamed core. The range of cell size was 2 to 9 micron diameter.

It should be recognized that the illustrative embodiments represent experimental equipment developed to produce relatively narrow webs at relatively slow extrusion rates and that various features and relative dimensions will be different in production apparatus. However, such differences are well understood by those skilled in the art and embody the same principles discussed above. Also, it should be apparent that the various specifically disclosed methods and apparatus can be adapted for producing material other than in the form of a web, e.g. strands, rods, tubes and materials of other cross-sectional configuration. For example, it is likely that for purposes of producing relatively wide webs, it may be preferable to extrude the material in the form of a partial tube or a complete tube which is then slit into a web during the production process, as is well known in the art of making conventional foamed or unfoamed plastic web material. Similarly, it should be understood that, while the invention has been described exclusively in the context of impregnating a plastic material with inert gas to provide foaming, the invention may also be useful in providing foamed material by combining the use of such gas impregnation with various nucleating agents and/or by means of organic foaming agents. provided that the occurrence of foaming is dependent upon a minimum foaming temperature, below which the foaming cannot occur.

Although the invention has been described with particular reference to presently preferred embodiments thereof, it will be understood that variations and modifications can be effected within the spirit and scope of the invention described above and as defined in the appended claims.

I claim:
1. A method for continuously producing foamed plastic material with integral unmodified laminar skin, comprising the steps of:
   (1) continuously providing to an environment at substantially atmospheric pressure an elongate element of gas-impregnated plastic material at below the atmospheric foaming temperature at which said material foams at such substantially atmospheric pressure.
   (2) conveying said element along a degassing path at a predetermined speed to permit gas to partially diffuse out of said element and selectively establishing the length of said degassing path for controlling the degree to which gas diffuses out of said element along said path.
   (3) heating said element beyond said degassing path, while at least some gas remains in core regions of said element, to a temperature above said atmospheric foaming temperature to initiate foaming thereof, and
   (4) cooling said heated element to below said atmospheric foaming temperature to terminate said foaming.

2. The method according to claim 1 in which the step of continuously providing said element of gas-impregnated plastic material comprises the steps of:
   (1) delivering molten gas-impregnated plastic material from an extruder to an extrusion die under sufficient pressure to prevent foaming of said material, and
   (2) maintaining the gas-impregnated plastic material within said extrusion die under sufficient pressure to prevent foaming while cooling such material to below its atmospheric foaming temperature prior to its extrusion from said extrusion die.

3. The method according to claim 1 in which the step of continuously providing said element of gas-impregnated plastic material comprises the steps of:
   (1) delivering molten gas-impregnated plastic material from an extruder to an extrusion die under sufficient pressure to prevent foaming of said material,
   (2) maintaining said gas-impregnated plastic material within said extrusion die under sufficient pressure to prevent foaming of said material,
   (3) extruding said material from said extrusion die into said environment at substantially atmospheric pressure while said material is above its atmospheric foaming temperature, and
   (4) cooling said material rapidly to below its atmospheric foaming temperature before said material has been exposed to substantially atmospheric pressure long enough to undergo significant foaming.

4. The method according to claim 1 in which the step of continuously providing said element of gas-impregnated plastic material comprises the steps of:
   (1) passing previously formed substantially gas free plastic material in elongate form continuously through a substantially sealed pressure vessel containing pressurized gas to impregnate said material within said vessel with such gas, and
   (2) selectively controlling the degree to which the material within said pressure vessel is impregnated with gas by selectively adjusting the length of the path followed by said material during its passage through said pressure vessel.

5. A method for continuously producing foamed plastic material with integral unmodified laminar skin, comprising the steps of:
   (1) delivering molten gas-impregnated plastic material from an extruder to an extrusion die under sufficient pressure to prevent foaming of said material,
   (2) maintaining the gas-impregnated material within said extrusion die under sufficient pressure to prevent foaming while cooling such material to below its atmospheric foaming temperature prior to its extrusion from said extrusion die,
   (3) extending said gas-impregnated material from said die at below its atmospheric foaming temperature,
   (4) conveying said material below its atmospheric foaming temperature along a degassing path beyond said die for allowing gas with which said material was impregnated to partially diffuse out of said material, and (5) reheating said material, after said gas has diffused out of surface regions of said material but while at least some gas remains in core regions thereof, to a temperature above said atmospheric foaming temperature to initiate foaming.

6. A method for continuously producing foamed plastic material with integral unmodified laminar skin, comprising the steps of:

(1) delivering molten gas-impregnated plastic material from an extruder to an extrusion die under sufficient pressure to prevent foaming of said material, (2) maintaining said gas-impregnated plastic within said extrusion die under sufficient pressure to prevent foaming of said material, (3) extending said material from said extrusion die into an environment at substantially atmospheric pressure while said material is above its atmospheric foaming temperature, (4) cooling said material rapidly to below its atmospheric foaming temperature before said material has been exposed to substantially atmospheric pressure long enough to undergo significant foaming, (5) conveying said material below its atmospheric foaming temperature along a degassing path beyond said die for allowing gas with which said material was impregnated to partially diffuse out of said material, and (6) reheating said material, after said gas has diffused out of surface regions of said material but while at least some gas remains in core regions thereof, to a temperature above said atmospheric foaming temperature to initiate foaming.

* * * * *

UNITED STATES PATENT OFFICE
CERTIFICATE OF CORRECTION

PATENT NO. : 4,761,256  
DATED : August 2, 1988  
INVENTOR(S) : Hardenbrook, et al Page 1 of 2

It is certified that error appears in the above-identified patent and that said Letters Patent are hereby corrected as shown below:

| | |
|---|---|
| Col. 5, line 12 | Delete "Fig. 2 Briefly," and insert --Fig. 2. Briefly,--. |
| Col. 10, line 27 | Delete "the" (first occurrence) and insert --that--. |
| Col. 11, line 9 | Delete "structures" and insert --structure-- |
| Col. 11, line 14 | Delete "ot" and insert --of--. |
| Col. 12, line 50 | Delete "plate" and insert --place--. |
| Col. 16, line 61 | Delete "seb" and insert --web--. |
| Col. 17, line 12 | Delete "F." and insert --F--. |
| Col. 17, line 44 | Delete "agents." and insert --agents,--. |
| Col. 18, line 64 | Delete "extending" and insert --extruding--. |
| Col. 20, line 1 | Delete "extending" and insert --extruding--. |

UNITED STATES PATENT OFFICE
CERTIFICATE OF CORRECTION

PATENT NO. : 4,761,256

DATED : August 2, 1988

INVENTOR(S) : Hardenbrook, et al

It is certified that error appears in the above-identified patent and that said Letters Patent are hereby corrected as shown below:

Col. 2, line 38 -   Delete "possible" and insert --possibly--.

Col. 4, lines 49-52 Delete "and Fig. 4 is a somewhat schematic cross-sectional view of a combined die and quenching device according to still another preferred embodiment of the invention;".

Signed and Sealed this

Twentieth Day of December, 1988

*Attest:*

DONALD J. QUIGG

*Attesting Officer*   *Commissioner of Patents and Trademarks*